Chromatogram Using Conventional Soda Lime Glass Bead Support

Chromatogram Using Silica Glass Bead Support

3,456,427
**GAS CHROMATOGRAPHY METHOD
AND APPARATUS**
Augustus M. Filbert and Michael L. Hair, Corning, N.Y.,
  assignors to Corning Glass Works, Corning, N.Y., a corporation of New York
Filed Oct. 26, 1966, Ser. No. 589,590
Int. Cl. B01d *15/08*
U.S. Cl. 55—67                                           4 Claims

ABSTRACT OF THE DISCLOSURE

Method of separating complex mixtures into their components by passing the mixtures in the vapor phase with an inert carrier gas through a liquid partition zone containing a stationary phase on a solid support comprising particles of silica glass; also includes the solid support material and chromatographic columns containing the solid support material.

---

This invention relates to gas chromatography and more particularly it relates to a solid support material for chromatographic columns.

Gas-liquid partition chromatography is a recent and very successful technique developed for analytical separations of complex compounds. This is a special form of chromatography having particular advantages, such as low cost high sensitivity in trace analyses, good quantitative accuracy, and ease of data interpretation. The technique is suitable for materials which are volatile without decomposition. Separation of the sample depends upon a difference in the distribution coefficient between a gaseous moving phase and a stationary phase of a nonvolatile liquid solvent spread as a thin film over a solid support. The sample to be analyzed is introduced into the moving gas stream and is carried on a chromatographic column. Constituents of the sample, commonly referred to as solutes, are distributed between the two phases and having differences in solubilities, they travel along the column at different rates and emerge at the end as distinct peaks separated by the carrier gas. Suitable means for detecting the vapor in the carrier gas and automatically recording the results are attached to the end of the column.

Since the column is the key to any chromatographic system, improvement in the support materials has been an important area of investigation. The ideal solid support should be chemically inert and thermally stable and have a high mechanical strength coupled with a relatively large surface area. The function of the support is to provide a surface for the thin liquid film with as large an interface as possible between the moving phase and the stationary phase, so as to facilitate partition between them. The most commonly used solid support material has been diatomaceous earth which consists of agglomerates of the siliceous skeletons of diatoms. These are treated in different ways to produce commercially available materials, such as Celite 545, firebrick, and Chromosorb P and W. However the use of ground diatomaceous earth has presented certain disadvantages because this support material is not completely inert and some reaction may occur with the components of the sample. Thus, serious tailing effects are observed due to strong adsorption. Further the sample has in some instances been chemically changed as for example, by isomerization or dehydration. Various attempts have been made to improve the symmetry of elution peaks by reducing the activity of the support. It has been suggested to chemically treat the support materials to remove the active sites and thereby eliminate the tailing effects. While acid washing can remove metal groups, the diatomaceous earths contain silanol and siloxane groups, capable of acting as adsorption sites for hydrogen bonding to solute molecules, that are not removed by washing.

Among nonporous supports, soda lime glass microbeads have been used most extensively because of their low porosity and very uniform size and shape. Since porosity is negligible, the stagnant gas phase encountered with porous supports is absent and resistance to gas phase mass transfer is reduced. With spherical glass beads it is also possible to prepare a column whose geometry is known and controllable, a situation that cannot be attained with the irregularly shaped diatomite particles. While the soda lime glass beads have made satisfactory supports with lightly loaded columns for nonpolar solutes, tailing nevertheless has been a problem for polar solutes. As used herein the term "nonpolar solute" includes aliphatic and aromatic hydrocarbon; while the term "polar solute" refers to organic molecules which have a permanent dipole and includes alcohols, ethers, ketones, aldehydes, acids, and esters, as well as organic halides, nitrogen compounds, sulfur compounds, phosphorus compounds, and polar derivatives thereof.

It is therefore an object of the present invention to provide an improved glass bead support for chromatographic columns.

Another object of the present invention is to provide an improved method of separating compounds by gas-liquid chromatography through the use of an inert glass bead support.

In accordance with the present invention, we have discovered a method of separating complex mixtures of compounds into their components by passing them in the vapor phase with an inert carrier gas through a liquid partition zone containing a stationary phase of an inert silica glass support. This glass support is substantially in the form of spherical beads having a particle size of 20–150 mesh U.S. Standard sieve. The advantage in our glass beads over supports heretofore used, including glass microbeads, resides in the improved symmetry of the elution peaks for polar solutes and efficiency of the column. Beads prepared as described herein can be used satisfactorily to separate polar organic compounds with substantially an absence of tailing effects.

The invention is more clearly understood from the following description taken in conjunction with the accompanying drawing in which.

Figure 1:
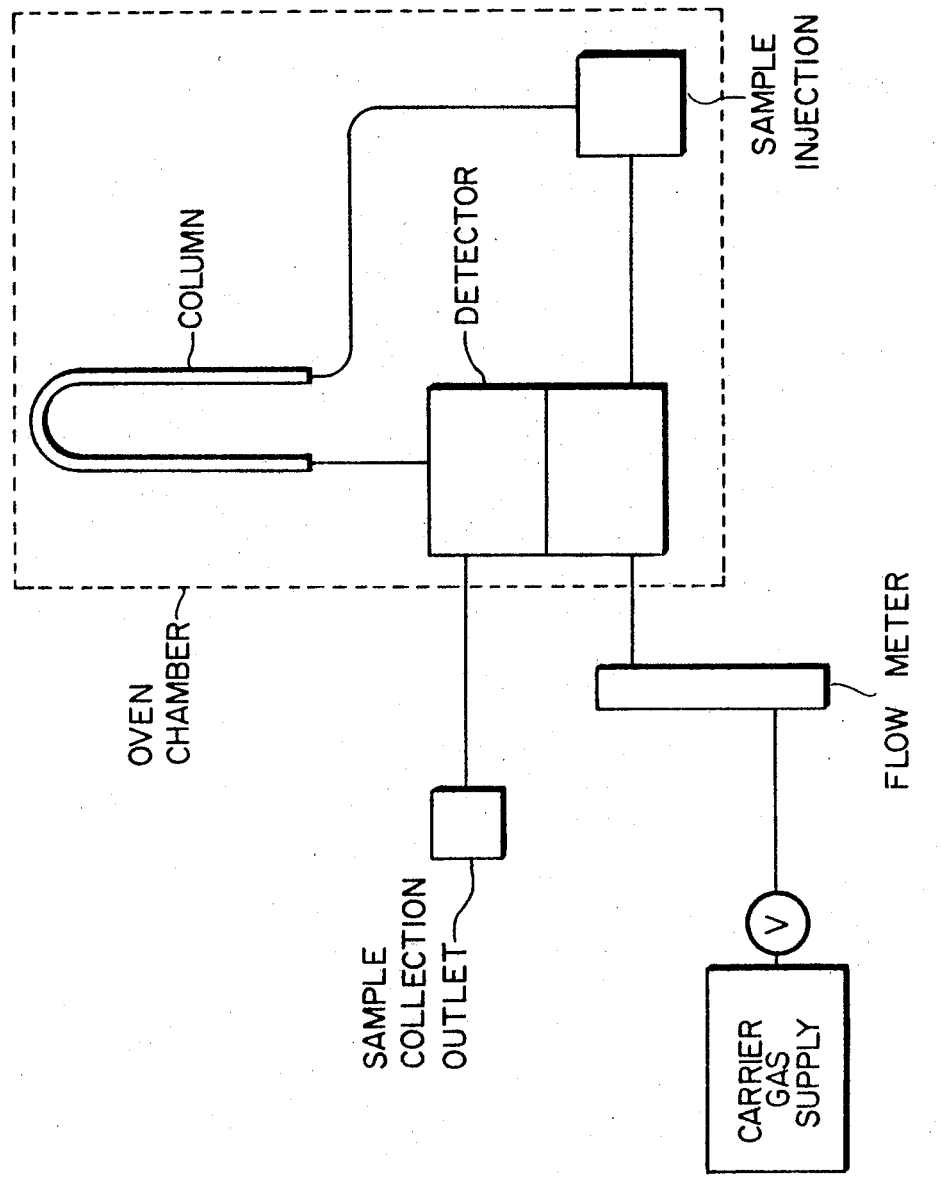
FIGURE 1 is a flow schematic diagram of a conventional apparatus used in gas liquid chromatography.

Referring now to FIGURE 1, this simple flow pattern indicates the operation of a commercially available instrument for gas chromatography sold by Perkin-Elmer under the name Vapor Fractometer. The carrier gas supplied from an external tank is maintained at constant flow rate by a pressure regulator. It passes through a flowmeter, and then by the reference side of a thermal conductivity detector before the point of sample injection is reached. At the liquid injection port, a flash heater vaporizes the sample instantly. Carrier gas and sample vapor then pass through a packed column wherein the sample components are separated, and swept one by one into the sensing side of the detector. Both sides of the thermal conductivity cell are incorporated into a balanced bridge circuit. When a thermal conductivity difference occurs between the gas alone and the sample vapor in the carrier gas, a resulting bridge unbalance provides a voltage which drives the pen on a sandard strip-chart recorder. The carrier gas and sample mixture then passes out to the atmosphere through the heated sample collection outlet where it may be trapped or simply vented.

Figure 2:
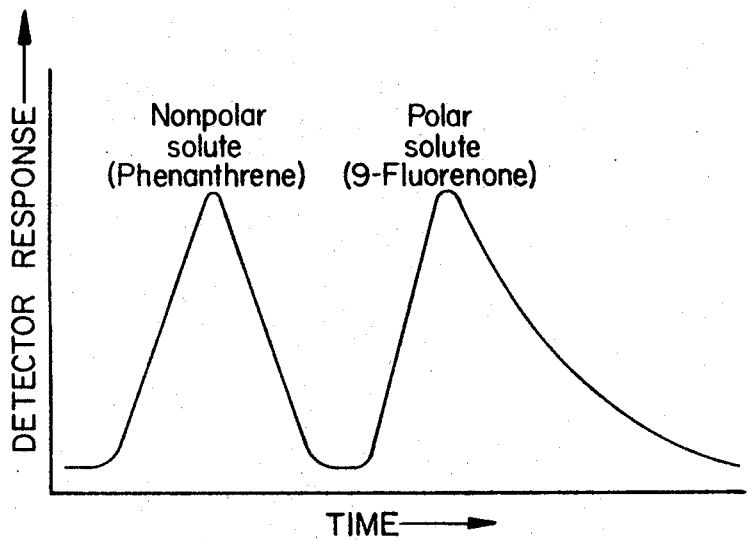
FIGURE 2 is a chromatogram illustrating the configuration of the peaks for polar and nonpolar solutes using a conventional soda-lime glass microbead support.

The separation of polar and nonpolar solutes and the configuration of the peaks using a column packed with soda-lime glass beads is illustrated by FIGURE 2. It can be seen that hte nonpolar solute gave satisfactory resolution, while the polar solute showed significant peak tailing. From these results it can be concluded that the soda-lime glass beads are not inert and that there is some adsorption of the polar solute on the support.

Figure 3:
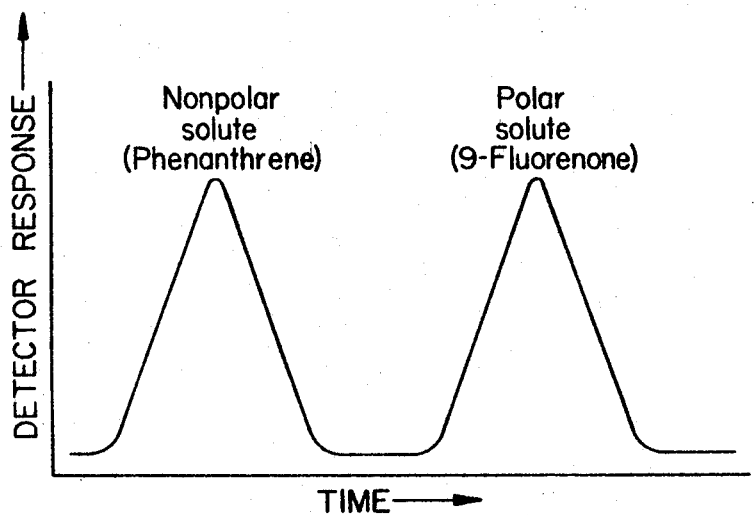
FIGURE 3 is a chromatogram illustrating the configuration of the peaks for polar and nonpolar solutes using the novel silica glass bead supports.

In the illustration shown in FIGURE 3 polar and non-polar solutes are separated using a column packed with the novel silica glass beads. Satisfactory separation and resolution is obtained for both polar and nonpolar solutes. No significant peak tailing is observed for polar solutes. Thus, no chemical or physical reaction appears to occur between the silica glass support and the solutes. It is thought that the tailing of polar molecules on conventional soda-lime glass beads is due to a heterogeneous glass surface caused by the presence of Lewis acid sites. But these sites are not present on the surface of silica glass beads.

The silica glass beads of the present invention functions as a support for the liquid solvent while being substantially inert to the moving phase. These properties are directly the result of the chemical composition which provides a homogeneous glass surface. The term "silica glass" as used herein means a glass composed of silica alone and may be made from precipitated silica, silica gel or any other of the amorphous forms of silica or from quartz, tridymite or cristobalite, the crystalline forms of silica. It is made typically from crushed quartz, because quartz is cheap and obtainable in quantity at a very high degree of purity. The silica glass beads may also be made from high purity sand containing at least about 99.5% silica and being substantially free of iron oxide and alumina.

In terms of physical properties, the glass bead support should be substantially uniform and have a spherical shape to give a minimum contact between adjacent beads when packed in the chromatographic column. The overall bead size range should be from 20–150 mesh U.S. Standard sieve, but advantageously individual particles for a given column should not exceed more than a difference of 20 mesh. In a preferred embodiment the particles are 60/80 mesh and 80/100 mesh. As another factor to be considered, the beads must be able to maintain their characteristics at the temperature used for the chromatographic column. For practical purposes, a temperature of operation is selected which is sufficiently high for all the components to be eluted in a reasonable time. This temperature is usually around the middle of the boiling range of the sample. The separation of particularly nonvolatile compounds may require temperatures up to about 325° C.

A general discussion of the field and the prior art is set forth by D. Ambrose et al., Gas Chromatography, Van Nostrand Co., Princeton, 1962. This detailed description is applicable to a large extent to the present invention. Thus, commonly used liquid solvents known in the chromatographic field, such as Dow Corning silicone oils 550 and 710 are equally useful for the present process. These should be lightly loaded on the column in amounts not greater than 3% by weight of the support and preferably in the range of 0.15–0.60%.

Several gases have been used as carriers, including hydrogen nitrogen, mixtures of hydrogen and nitrogen, helium, argon and carbon dioxide. The gases are passed through the column at low rates of flow of about 20–50 milliliter per minute at pressures not much above atmospheric.

My invention is further illustrated by the following example.

EXAMPLE

Gas chromatographic measurements were made with a Perkin-Elmer Model 154C Vapor Fractometer, designed for operation from room temperature to about 250° C. The chromatograph was modified by winding a heating tape, powered by an auxiliary voltage supply, around the injection block. The block was then covered with glass wool to insulate it from the oven. The chromatograph was equipped with a conventional thermal conductivity detector, electrometer, and 0–5 mv. recorder. Columns were prepared from 6 foot, ¼ inch O.D. lengths of U-shaped copper tubing.

The silica glass beads were prepared by melting Brazilian quartz (99.9% $SiO_2$) in a 25 kilowatt induction heater. Quartz particles about the desired bead size, 80/100 mesh U.S. Standard sieve, were melted at temperatures greater than 4000° C. and shot into a spherical shape. The resulting beads were then collected and sized to the above mesh.

For purposes of comparison conventional soda lime glass beads were prepared by melting under standard conditions in a platinum crucible, a glass batch composed in weight percent on the oxide basis of 64.0 percent silica, 14.0 percent soda, 13.0 percent calcium oxide, and 9.0 percent magnesium oxide. The soda-lime glass was crushed to particles of the approximate size of 80/100 mesh. The powder was allowed to flow through a high velocity gas oxygen flame (T>2000° C.) where it was melted and shot into spherically shaped beads. Beads were collected and sized for use in the chromatographic column.

The column packings were prepared using standard procedures by dissolving the liquid phase, Dow Corning 550 Fluid in chloroform. After the resulting solution was added to the test beads, the volatile solvent was evaporated from the mixture under mild heating in a rotary evaporator. Columns were made from quarter inch copper tubing six feet in length to which the beads were added with vigorous tapping along the side of the tube until no more packing was accepted. These columns were made with approximately 50 grams of glass beads. When the glass beads were not free flowing, introduction of the beads into the tubing was made in small portions.

The packed column was then placed in the Vapor Fractometer as shown in FIGURE 1. With 35 ml./min. of helium flowing through the column, it was conditioned at 200° C. overnight, and was then ready for evaluation.

Samples of the compounds in an amount of one microgram where injected onto the chromatographic column using a 10 microliter syringe. In the case of solids, the samples were dissolved in chloroform. The following polar and non-polar solutes were investigated as representative compounds: acetone, benzene, carbon tetrachloride, ethanol, pentane, o-phenylphenol, diphenylamine, benzophenone, 9-fluorenone, dibenzylamine, phenanthrene, and pyridine.

Typical results are shown in FIGURES 2 and 3 and these may be summarized as follows:

TABLE

| Column Support | Nonpolar Solute | Polar Solute |
| --- | --- | --- |
| Silica beads | Satisfactory, no tailing | Satisfactory, no tailing. |
| Soda lime beads | do | Peak tailing. |

As used herein the terms "etching" and "leaching" are considered to be synonymous.

We claim:
1. A method of separating complex mixtures into their components comprising passing said mixtures in the vapor phase with an inert carrier gas through a liquid partition zone containing a stationary phase on a solid support comprising particles of silica glass consisting essentially of at least 99.5% silica.

2. The method of claim 1, wherein said particles are substantially spherical and have a size of 20–150 mesh U.S. Standard sieve.

3. A chromatographic column containing a solid support material comprising particles of silica glass consisting essentially of at least 99.5% silica and having a liquid solvent coated thereon.

4. A chromatographic column according to claim 3 wherein said particles are substantially spherical and have a particle size of 20–150 mesh U.S. Standard sieve.

References Cited

UNITED STATES PATENTS

| | | | |
|---|---|---|---|
| 3,031,318 | 4/1962 | Janakirama-Rao | 106—52 |
| 3,077,103 | 2/1963 | Heaton | 55—197 X |
| 3,223,747 | 12/1965 | Bohrer | 55—197 X |

OTHER REFERENCES

Gas Chromatography Abstracts, 1963, 394 p. 75, Ashley et al.

The Condensed Chemical Dictionary, Seventh Edition, Reinhold—New York, 1966, p. 1014.

REUBEN FRIEDMAN, Primary Examiner

J. L. DE CESARE, Assistant Examiner